(12) United States Patent
Hesse

(10) Patent No.: US 6,934,672 B2
(45) Date of Patent: Aug. 23, 2005

(54) CONTROL LOOP STATUS MAINTAINER FOR TEMPORARILY OPENED CONTROL LOOPS

(75) Inventor: Kurt F. Hesse, Benson, NC (US)

(73) Assignee: Texas Instruments Incorporated, Dallas, TX (US)

( * ) Notice: Subject to any disclaimer, the term of this patent is extended or adjusted under 35 U.S.C. 154(b) by 732 days.

(21) Appl. No.: 10/033,566

(22) Filed: Dec. 27, 2001

(65) Prior Publication Data

US 2003/0125819 A1 Jul. 3, 2003

(51) Int. Cl.$^7$ ............................................. G06F 17/50
(52) U.S. Cl. ...................................... 703/14; 703/280
(58) Field of Search ........................... 703/14; 323/280, 323/274, 316, 283

(56) References Cited

U.S. PATENT DOCUMENTS

| | | | | |
|---|---|---|---|---|
| 4,465,966 A | * | 8/1984 | Long et al. | 323/348 |
| 5,442,534 A | * | 8/1995 | Cuk et al. | 363/16 |
| 6,246,221 B1 | * | 6/2001 | Xi | 323/280 |
| 6,600,299 B2 | * | 7/2003 | Xi | 323/280 |

* cited by examiner

Primary Examiner—Thai Phan
(74) Attorney, Agent, or Firm—W. Daniel Swayze, Jr.; W. James Brady; Frederick J. Telecky, Jr.

(57) ABSTRACT

A system provides primary and alternate control circuits to a controlled system through an output port. A monitoring circuit that monitors a parameter of the controlled system selects the control methodology. The primary control circuit, consisting of a primary active part and a regulator, and an alternate control circuit receive feedback from the controlled system. A switching mechanism, controlled by an output of the monitoring circuit, connects the appropriate control circuit to the controlled system and switches internal connections as needed. During alternate mode, a simulator of the controlled system as driven by the primary active control circuit provides an output representative of the output of the regulator that would cause the current output of the controlled system if the system were in primary mode. This simulator output is used when transitioning back to primary mode to minimize transients in the output of the controlled system.

10 Claims, 7 Drawing Sheets

CONTROL LOOP STATUS MAINTAINER FOR TEMPORARILY OPENED CONTROL LOOPS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to control circuits and, more specifically, to situations in which one of two control circuits may be selected to control a single controlled system. The optimal control circuit for a controlled system, such as a power supply, may depend on the conditions under which the controlled system is operating. Rather than develop two control circuits and manually switch between them, it is desired to monitor the controlled system and switch between the control circuits based on the monitored state.

This desire has been frustrated by the fact that the output of an unused control circuit does not necessarily track the active control circuit. Therefore, when control is switched between the circuits, the controlled system can be disturbed in an undesirable manner during the transition.

BRIEF SUMMARY OF THE INVENTION

A system provides primary and alternate control circuits to a controlled system through an output port. A monitoring circuit that monitors a parameter of the controlled system selects the control methodology. The primary and alternate control circuits receive feedback from the controlled system and are connectable to an output port that drives the controlled system. A switching mechanism, controlled by an output of the monitoring circuit, connects the appropriate control circuit to the controlled system and switches internal connections as needed. A transient management system limits the output transient during the transition. Part of the transient management system is a simulator of the primary control circuit connected to the controlled system. When the primary control circuit is connected to the controlled system, an input to the simulator is connected to an output of an error amplifier driving the primary control circuit. Otherwise, in an alternate operating mode, the simulator input is connected to a simulator feedback. When the alternate control circuit is active, the transient management system emulates the operation of the system operating in the primary operating mode and provides an output representative of what the error amplifier output would be if the primary control circuit were creating the controlled system's output. This transient management system output is retained across a capacitor and used when switching back to primary mode to minimize transients in the output of the controlled system. Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Figure 1:
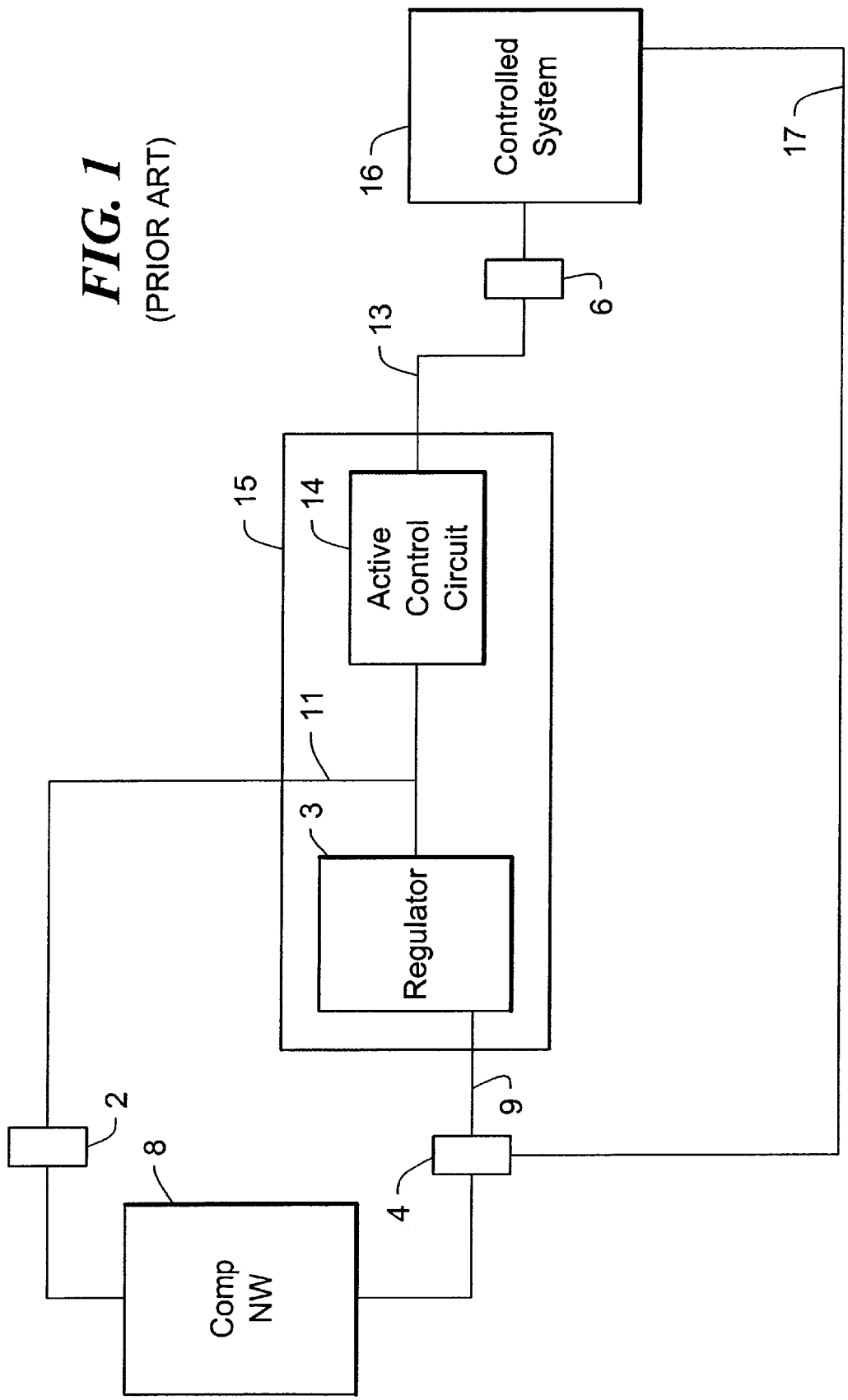
FIG. 1 is a block diagram of a prior art single mode control circuit.

It has been known to manage controlled systems by a methodology that feeds back a monitored variable from a controlled system to a feedback input of a control system. FIG. 1 illustrates a prior art control circuit. The control circuit 15 consists of a regulator 3 and an active control circuit 14. The active control circuit 14 has an output 13 that is connected to the controlled system 16. A feedback output 17 connects to an input 9 of the regulator 3 to determine the operating conditions for the active control circuit 14. A compensation network 8 is connected between an output 11 of the regulator 3 and the feedback input 9 functioning as a feedback path for an operational amplifier (not shown) in the regulator 3. When the control circuit 15 is implemented in an integrated circuit (IC), the regulator 3 and active control circuit 14 are contained within the IC package. A pin 4 is then used for the feedback input 9, a pin 2 is used to provide the output 11 of the regulator 3 to the compensation network 8, and a pin 6 is used for the output 13 to the controlled system 16.

Figure 2:
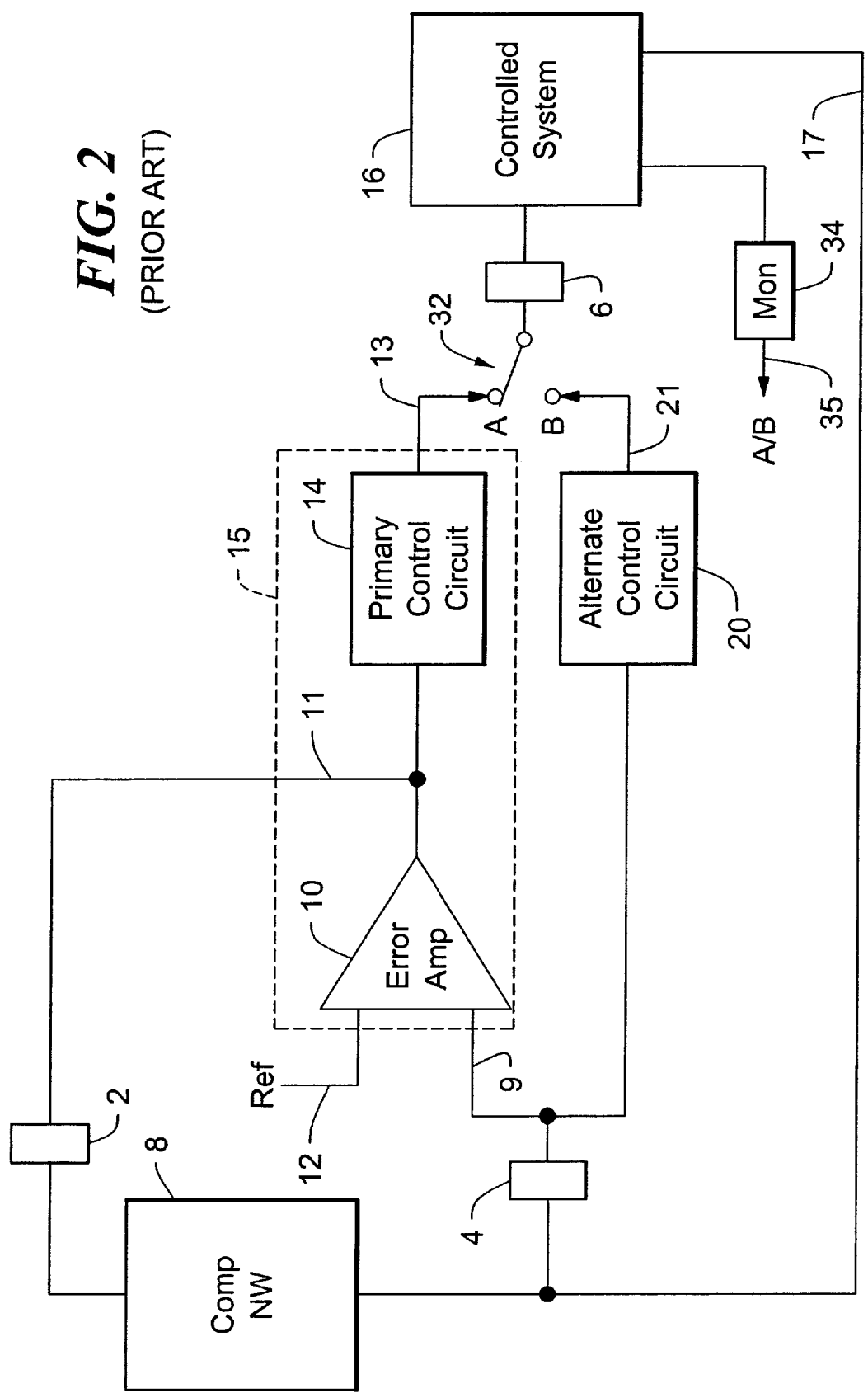
FIG. 2 is a block diagram of a prior art system using two control circuits that are selected based on a variable.

Some controlled systems operate in a number of modes. For power supplies, these modes may be a high current and a low current mode. For other systems, a different variable would determine the modes. To control a system having two modes, an integrated circuit such as illustrated in FIG. 2 could be developed. In FIG. 2, a switch connects the primary control system 15 or an alternate control circuit 20 to the controlled system. The outputs of the primary control circuit, composed of an error amp 10 acting as a regulator and the primary control circuit 14, and the alternate control circuit 20 are connected through switch 32 to pin 6 and the controlled system 16. Both the primary control system 15 and the alternate control circuit 20 receive the feedback 17 via input pin 4. A compensation network 8 is connected between the error amp output pin 2 and pin 4. A circuit 34 monitors a parameter of the controlled system 16 and outputs a control line A/B 35 to set switch 32 to one of two control modes, primary or alternate. In FIG. 2, the system is shown in the primary (A) mode in which the output 13 of the primary control circuit 14 is connected to the controlled system 16.

Figure 3:
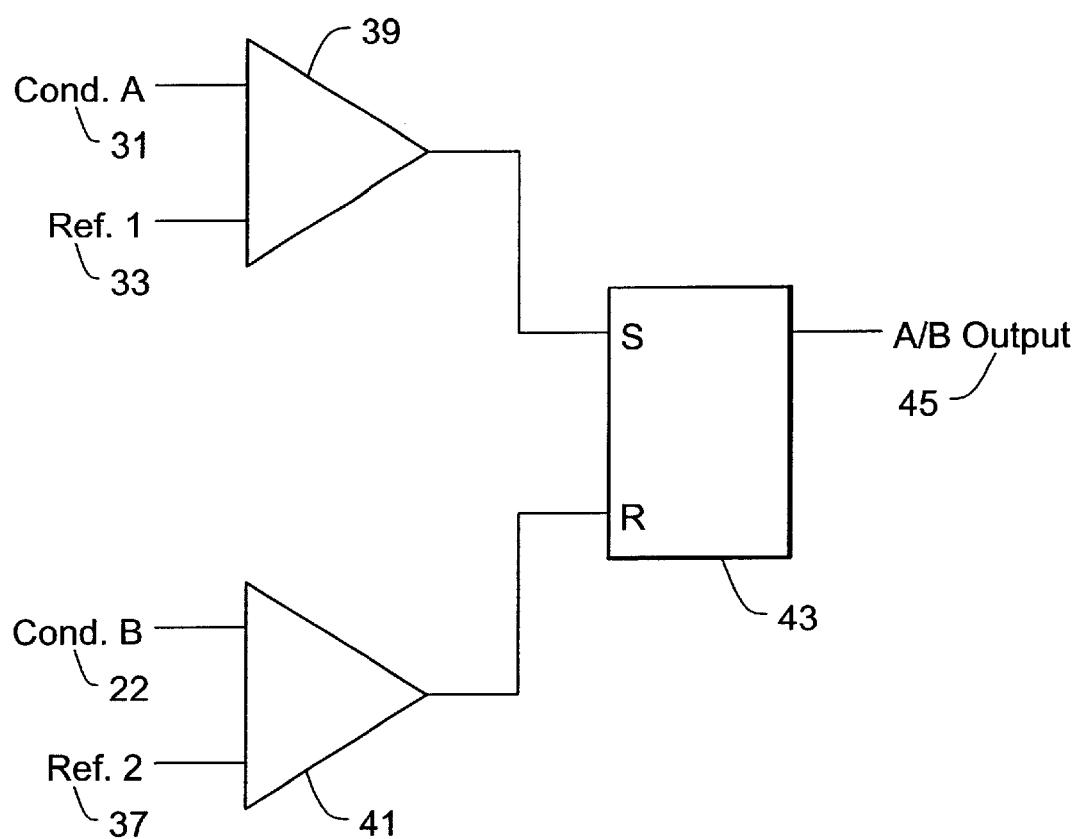
FIG. 3 is a block diagram of a logic circuit that can be utilized in conjunction with the system of FIG. 2.

FIG. 3 illustrates one way of implementing monitoring circuit 34. FIG. 3 utilizes two condition indicators 31 and 22 from the controlled system 16 that are mutually exclusive. The states of these indictors specify how the controlled system 16 is operating. Each indicator 31, 22 is compared against a reference 33, 37 by a comparator 39, 41. If condition indicator A 31 is in the appropriate state, the S side of a flip-flop 43 is set and the A/B output 45 indicates condition A. If condition indicator B 22 is in the appropriate state, the R side of the flip-flop 43 is set and the A/B output 45 indicates condition B. In some situations, only one condition indicator needs to be monitored because its level crosses distinct thresholds indicating the two modes. In this situation the indictors 31, 22 are tied together. The mode indicator 43 is triggered by one condition and will stay in that mode until the alternate condition is satisfied, allowing dynamic selection of modes.

When using the circuit of FIG. 2, a problem arises when switching between the alternate control scheme to the primary control scheme even if the control schemes respond similarly to the same feedback response. When the input 6 to controlled system 16 is switched between the output of the primary control circuit 14 and the alternate control circuit 20, the controlled system 16 likely sees a perturbation, which may be fairly large, on input pin 6. The transient arises because the inactive control system may not be tracking the conditions in the controlled system. The resultant response by the controlled system 16 may be so undesirable as to prevent use of the dual control circuits as illustrated.

A technique to mitigate this problem using a transient management system may be implemented if the feedback outputs of the controlled system are of the same general level in both operating modes so that the transient management system does not need to generate extreme corrective voltages across the compensation network. The transient management system uses a simulator of the disconnected control circuit and the controlled system. The simulator must be able to simulate the control circuit and controlled system with the voltages and conditions available on the IC.

Figure 4:
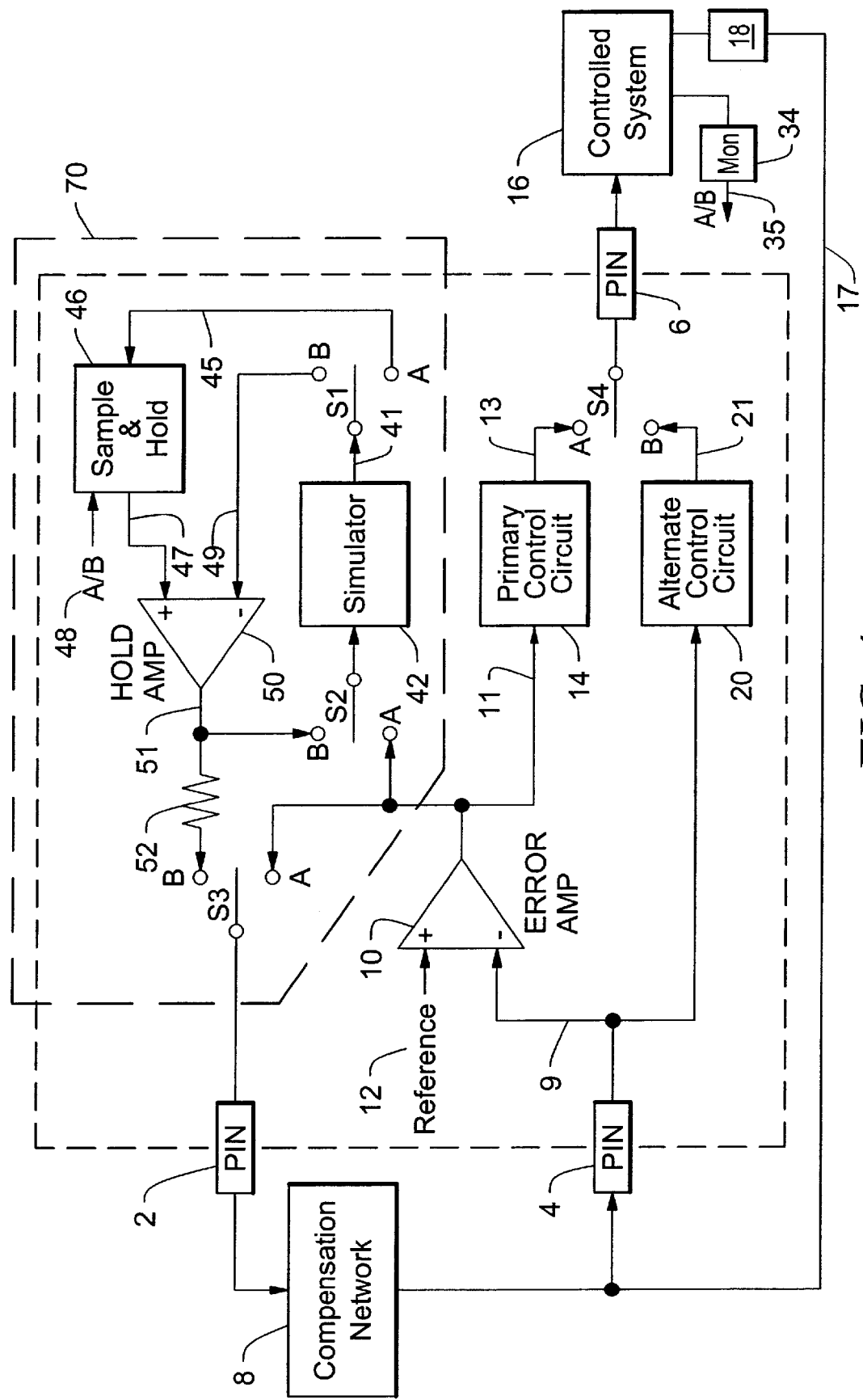
FIG. 4 is a block diagram of a system in accordance with an implementation of the invention.

FIG. 4 illustrates a way to minimize the prior art problem for a system that cannot tolerate the perturbation on pin 6 when transitioning from alternate to primary control mode. In FIG. 4, a transient management system 70 composed of a simulator 42, a hold amplifier 50, and a sample and hold 46, is added to the control system that might cause a perturbation, in FIG. 4, the primary control system 15 of FIG. 2. The simulator 42 is capable of simulating the mode A operation of the primary control circuit 14 plus the controlled system 16. The output 41 of the simulator 42 is a scaled simulation of the feedback output 17 of the controlled system 16. The sample and hold 46 provides a scaled reference 47 for the transient management system and the hold amplifier 50 simulates the error amplifier 10 by comparing the simulator output 41 against the scaled reference 47, as explained below.

The transient management system 70 is preconditioned during mode A, while the primary control circuit is driving the controlled system, and performs mode A simulation while the alternate control circuit 20 is driving the controlled system 16. Switches S1, S2 and S3 that change the state of the transient management system 70 are controlled by a monitoring circuit 34. During simulation, the output 51 of the hold amplifier 50 represents what the output 11 of the error amplifier 10 would have to be in order to cause the controlled system feedback output 17, when driven by the primary control circuit 14, to match the value being generated by the controlled system 16 driven by the alternate control circuit. During mode A, output 51 is not connected. During Mode B, the output 51 of the hold amplifier 50 is part of a simulator feedback loop and, buffered by a high impedance resistor 52, is connected to the compensation network 8 via switch S3 and pin 2. Since the compensation network 8 incorporates a capacitor (not shown), the value at output pin 2 is maintained at a level that, if it were on line 11, would cause the controlled system 16 to produce the value it is producing in mode B, if mode A were invoked. The voltage on pin 2 will result in a minimal change of the controlled system output when operation actually shifts back to Mode A.

FIG. 4 shows that when the alternate control circuit 20 is engaged (mode B), an alternate control feedback loop comprising alternate control circuit 20, switch S4, pin 6, the controlled system 16 and the feedback input pin 4 is formed. When control is changed to mode A, the error amplifier 10 and primary control circuit 14 replace circuit 20 in the control feedback loop. In addition, at the transition, switch S3 removes the high impedance resistor from the compensation network and connects the compensation network 8 through pin 2 to the error amplifier output 11. The voltage at pin 4 is therefore controlled by the sum of the voltages contributed by the compensation network and the feedback input. An impedance 18 is present between the controlled system 16 and the feedback line 17 to determine the contribution of the feedback voltage to the voltage divider on pin 4.

The error amplifier 10 sets its output 11 to a value that will drive the voltage on pin 4 to equal the reference value 12. To have a smooth transition, the voltage stored on the compensation network 8 capacitor must be equal to the difference between the reference value 12 and the value that will cause the error amp output 11 to control the controlled system 16 to generate the output and feedback 17 that was being generated in mode B just before the transition. That value, stored across the capacitor, is what the transient management system 70 predicted.

Figure 4A:
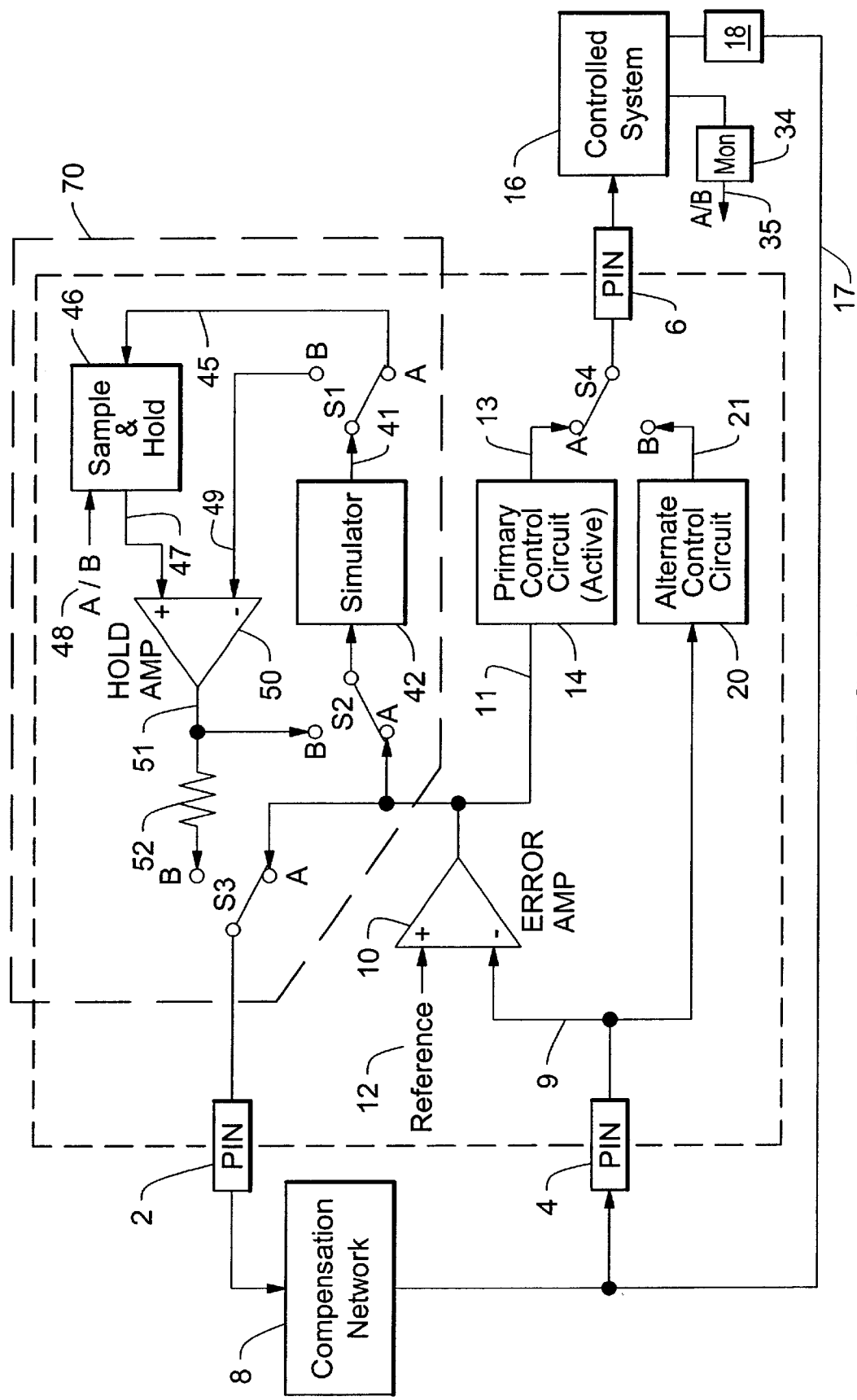
FIG. 4A is an illustration of the system of FIG. 4 when operating in a first ("A") mode.
Figure 4B:
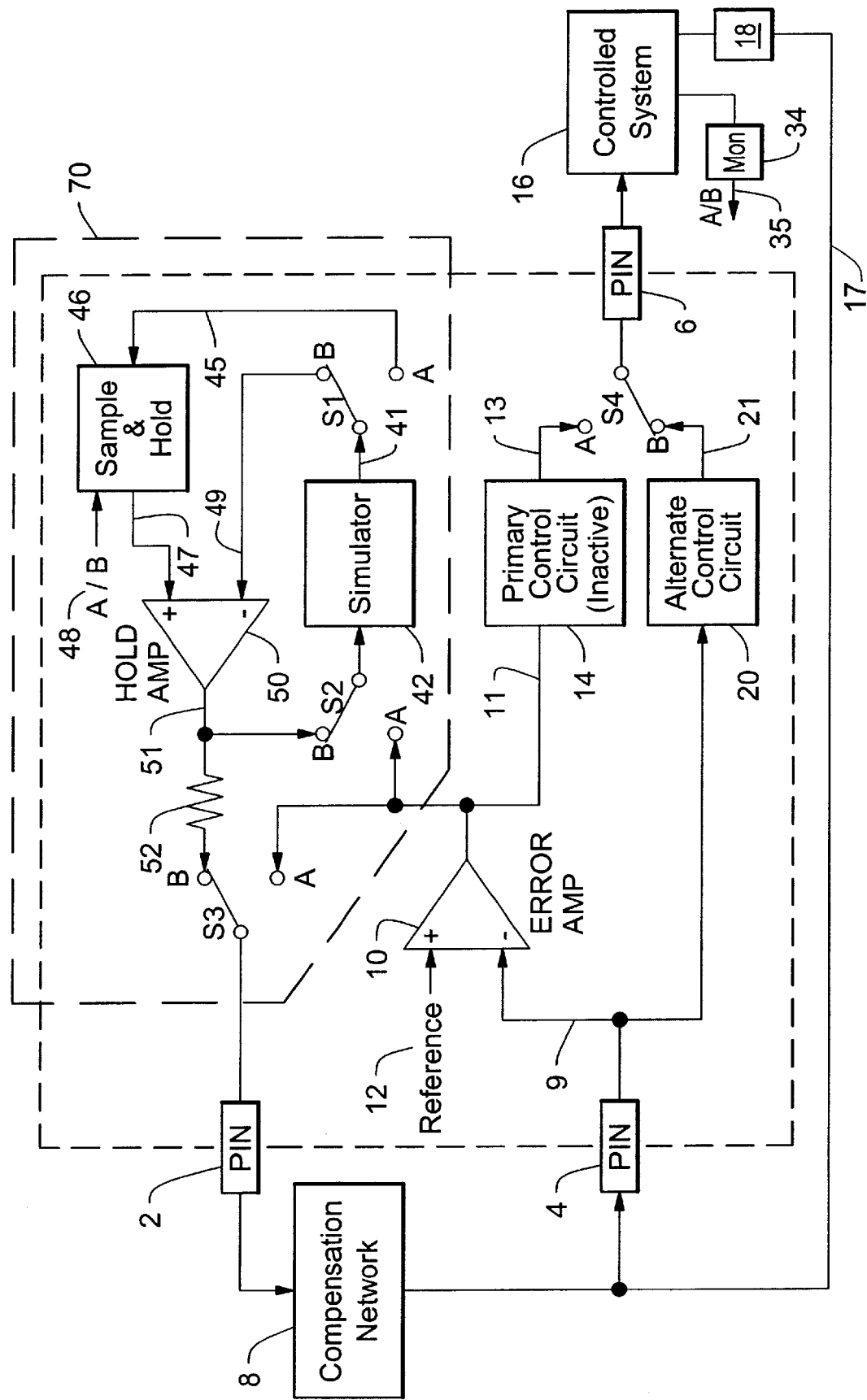
FIG. 4B is an illustration of the system of FIG. 4 when operating in a second ("B") mode.

FIGS. 4A and 4B illustrate the dual mode control system with transient management system 70 in the two modes of operation. In FIG. 4A, the system is shown in mode A, with the primary control circuit 14 controlling the controlled system 16. The controlled system feedback 17, after passing through an impedance 18, enters the IC on pin 4 providing feedback to the inverting input 9 of error amplifier 10. The error amplifier output 11 in turn drives the primary control circuit 14. The feedback output 17 is also provided as an input to the alternate control circuit 20, but the output 21 of the alternate control circuit 20 does not connect to the controlled system 16 because of switch S4. The error amplifier output 11 is also brought out on pin 2 to allow the compensation network 8 to be connected between the error amplifier output 11 and the feedback input 4. Further, the error amplifier output 11 is also fed through switch S2 to the simulator 42 that simulates components 14 and 16 connected together. The output 41 of the simulator 42 may be a scaled representation of the controlled system output. Switch S directs the simulator's output 41 to the sample and hold 46 that is continuously sampling during mode A. Hold amplifier 50 tries to compare the sample and hold output 47 to the signal on the negative input, but is not operational due to the settings of switches S2 and S3. So, while the primary control circuits 10 and 14 are active, the sample and hold 46 is continually being preconditioned by an input 45 that is a scaled simulation of the feedback output 17 which is being kept close to the reference voltage 12 by the operation of the primary feedback loop When the mode switch is set to mode B, as shown in FIG. 4B, the primary control circuit 14 is disconnected from the output by switch S4. The alternate control circuit 20 is connected to the output pin 6 and receives feedback 17 from the controlled system 16 through pin 4 as previously described. In the transient management system, the sample and hold 46 is set to hold mode when input 48 indicates mode B. Therefore, the sample and hold now retains a scaled value of approximately reference 12. The output 41 of the simulator 42 is connected to the inverting input 49 of hold amplifier 50 by switch S1. The hold amplifier 50 functions as an error amplifier comparing the simulator output 41 to the value stored in the sample and hold 46. Although the inputs to the hold amplifier 50 are scaled relative to the controlled system output, the hold amplifier's output 51 has the same range as the error amplifier's output 11. The hold amplifier output 51 is fed back to the simulator 42 to complete the emulation loop and, in addition, passes through a high impedance resistor 5, and the switch S3 to connect to the compensation network 8. The value of resistor 52 is chosen to minimize the simulation's effect on the feedback signal on pin 4 while still allowing preconditioning of the compensation network to take place. The primary control circuit output 13 fluctuates as directed by error amplifier 10 while in mode B, but has no effect on the input from the feedback line 17.

When the control switches back to the primary control mode from the alternate control mode, Switch S3 connects the compensation network 8 to the error amplifier output 11. This removes the high impedance resistor 52 from the impedance divider network determining the voltage at pin 4. The impedance values and the voltage placed across the compensation network 8 by the hold amplifier 50 are chosen so that, at the transition, the voltage at pin 2 is the value necessary to cause the error amplifier output 11 to drive the primary control circuit 14 to cause the controlled system 16 to output the same value as it was outputting before the transition. The error amplifier 10 adjusts its output 11 to keep or move the signal at inverting input 9 to equal the reference level 12. Since the compensation network 8 has been preconditioned by the transient management system 70 to have the correct voltage stored across it, the output 11 of the operational amplifier 10 when the control shift is made is the value that causes the primary control circuit 14 to drive the controlled system 16 to produce relatively the same feedback signal 17 (and output) that the alternate control circuit 20 caused it to produce. The transient management system has allowed the system to remain largely transient perturbation free. The use of the transient management system 70 has been illustrated smoothing the transition from alternate control mode to primary control mode. If the perturbation is intolerable for both transitions, a second similar transient management system could be implemented if the alternate control circuit 20 is composed of a regulator component and an active control circuit component.

Figure 5:
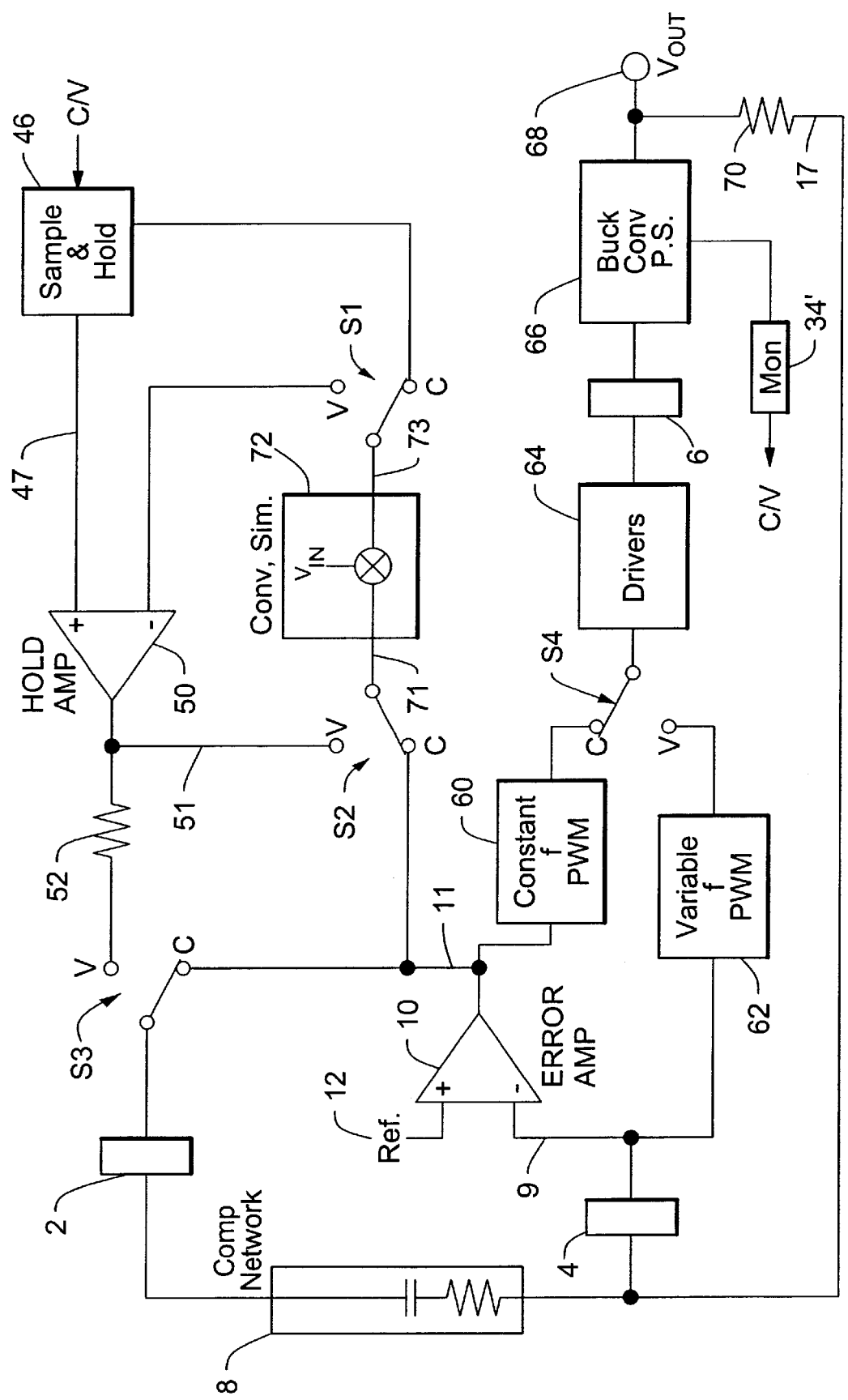
FIG. 5 is a block diagram of a system in which a buck converter switching power supply is operated in accordance with the invention.

An application of this method to the control of a buck converter switching power supply is illustrated in FIG. 5. A buck converter power supply is best controlled by a constant frequency pulse width modulation (CFPWM) circuit 60 when the power supply is operating under heavier load conditions. When the power supply is operating under lighter loads, it is more advantageously controlled using a variable frequency pulse width modulation (VFPWM) circuit 62.

In FIG. 5, the converter's load is monitored by the monitoring circuit 34' that changes the state of the C/V (Constant/Variable) signal used to change between operating modes. The primary mode of controlling the buck converter switching power supply 66 is the CFPWM control circuit 60 that is connected to drivers 64 via switch S4 during the time the monitoring circuit 34' indicates the constant frequency ("C") mode. A good simulator of a buck converter in C mode is a scaled product of the voltage supplied to the buck converter and the duty cycle of the converter, which is a function of the error amplifier output. While in C mode, the output 11 of error amplifier 10 is fed by switch S2 to a converter simulator 72 that multiplies $V_{in}$ (A voltage on the integrated circuit that represents the voltage input to the buck converter 66) by a function of the value of the error amp output 11. The output 73 of the simulator 72 is connected to a sample and hold 46 that is controlled by a C/V input from the monitor circuit 34'. The output 11 of the error amplifier 10 is further connected through switch S3 to the compensation network 8' to complete the control loop for the error amplifier 10.

When switching from CFPWM (heavy load) to VFPWM (light load) there is minimal reason to be concerned about transients in the buck converter output 68. Therefore, no transient management system is utilized. When switching from a light to heavy load, an external system could be active and sensitive to the voltage during the transition. Therefore, a transient management system is needed for this transition. When switching from C to V mode, the sample and hold 46 is switched into hold mode, retaining the last value of the output 73 of the simulator 72 (a scaled mirror of the feedback output 17 of the buck converter 66). During the time VFPWM is being used (V mode), the simulator output 73 is disconnected from the sample and hold 46 and connected to the negative input of a hold amplifier 50 that compares the current simulator output 73 to the retained simulator output 47 and generates an output to try to bring the values toward each other. The hold amplifier output 51 is connected to the simulator input 71 and through a resistor to the compensation network 8. The compensation network 8 develops a voltage across its terminals.

When C mode is reinitiated, the error amplifier 10 forces a voltage on pin 2 that causes the voltage at pin 4 to equal the reference voltage 12. Since the compensation network was preconditioned in the V mode to have the correct voltage stored across its terminals, the voltage the error amplifier 10 forces on pin 2 (which is also the control voltage for the CFPWM controller 60) is the voltage that causes the CFPWM controller 60 to drive the buck converter 66 to produce the same voltage on output 68 that it was producing when being controlled by the VFPWM controller 62. The result is a smooth transition from V to C mode with a minimum of output transient disturbance.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. An apparatus to provide multiple-mode control to a controlled system through an output port comprising:
   a primary control circuit, having a regulator portion driving an active controlling portion, receiving a feedback output from said controlled system at an input of said regulator portion, an output of said primary control circuit connectable to said output port;
   an alternate control circuit receiving said feedback output, an output of said alternate control circuit connectable to said output port;
   a monitoring circuit generating a mode indication of one of a primary mode and an alternate mode in response to a monitored parameter of said controlled system;
   a selecting mechanism disposed between said output port and said outputs of said primary control circuit and said alternate control circuit, said selecting mechanism controlled by said mode indication of said monitoring circuit;

a transient management system operative to simulate said feedback output of said controlled system when driven by said active controlling portion, said transient management system having an input connected to an output of said regulator portion when said primary control circuit is connected to said controlled system, said input connected to a transient management system feedback output otherwise; and a compensation network including a first terminal connected to said feedback output and a second terminal connected to a switch providing connection to an output of said regulator portion in primary mode and to said transient management feedback output in alternate mode, a capacitance present in said compensation network, wherein an output of said controlled system remains approximately steady when the multi-mode control system changes from alternate to primary control mode.

2. The system of claim 1 wherein said transient management system comprises;

a simulator connected to said input, said simulator simulating said active controlling portion and said controlled system driven by said active controlling portion;

a sample and hold circuit adapted to sample a simulator output while said primary control circuit is connected to said controlled system, said sample and hold circuit adapted to hold an immediate prior value of said simulator output when said monitoring circuit output changes from said primary mode to said alternate mode; and a simulator regulator operative to compare the values of a held output of said sample and hold circuit and said output of said simulator, an output of said simulator regulator connected to an input of said simulator while said primary control circuit is disconnected from said controlled system, said output of said simulator regulator providing said output of said transient management system.

3. The system of claim 1 wherein said controlled system is a switching power supply, said primary control circuit is a constant frequency pulse width modulator, and said alternate control circuit is a variable frequency pulse width modulator.

4. The system of claim 3 wherein the parameter monitored by said monitoring circuit is a current load of said switching power supply.

5. The system of claim 3 wherein said switching power supply is a buck converter.

6. The system of claim 2 wherein said regulator portion and said simulator regulator are error amplifiers.

7. In a system in which a control output drives a controlled system having a monitor point connected back to a feedback input, and a compensation network incorporating a storage element connected between said feedback input and a compensation output, a method of sharing said control output between two control circuits to minimize transients on an output of said controlled system as control is switched between said two control circuits in response to a mode control signal, the method comprising:

in response to said mode control signal indicating a primary mode, connecting said control output to a first control circuit output, connecting an error amplifier output to said compensation output, connecting said error amplifier output to a simulator circuit input, wherein said simulator circuit simulates the operation of said controlled system as driven by said first control circuit, setting a sample and hold circuit to sample and connecting an output of said simulator circuit to a sample and hold circuit input;

in response to said mode control signal changing to indicate a secondary mode, switching said control output to a second control circuit output, switching said sample and hold circuit to hold mode, connecting an output of said sample and hold circuit to a non-inverting input of a simulator error amplifier, switching said simulator output to an inverting input of said simulator error amplifier, and connecting an output of said simulator error amplifier to both said compensation output and said input to said simulator; and in response to said mode control signal changing to indicate said primary mode, changing said output of said error amplifier to assume a correct voltage to minimize transient disturbances in said output of said controlled system, wherein said change is accomplished by controlling the offset stored in said compensation network during operation in said secondary mode.

8. The method of claim 7 wherein said controlled system is a switching power supply, said first control circuit is a constant frequency pulse width modulator, and said second control circuit is a variable frequency pulse width modulator.

9. The method of claim 8 wherein said mode control signal is generated by a circuit monitoring a current load of said switching power supply.

10. The method of claim 8 wherein said switching power supply is a buck converter.

* * * * *